(12) United States Patent
Christodoulides et al.

(10) Patent No.: US 6,665,361 B1
(45) Date of Patent: Dec. 16, 2003

(54) COMMUNICATION METHOD AND APPARATUS

(75) Inventors: Louis Mimis Christodoulides, Buckinghamshire (GB); Howard Ray Feldman, Middlesex (GB); Eyal Trachtman, London (GB); Siu Wah Wong, London (GB); Hok Shuen Wong, Surrey (GB)

(73) Assignee: Inmarsat, Ltd., London (GB)

( * ) Notice: Subject to any disclaimer, the term of this patent is extended or adjusted under 35 U.S.C. 154(b) by 0 days.

(21) Appl. No.: 09/262,064

(22) Filed: Mar. 4, 1999

(30) Foreign Application Priority Data

Mar. 4, 1998 (GB) .............................................. 9804639
Mar. 4, 1998 (GB) .............................................. 9804640

(51) Int. Cl.$^7$ ................................................. H04L 7/06
(52) U.S. Cl. ........................ 375/364; 375/261; 375/298
(58) Field of Search ............................. 375/261, 298, 375/354, 362, 364, 365, 366; 370/510, 514, 278, 280, 316, 321, 324

(56) References Cited

U.S. PATENT DOCUMENTS

| | | | | | |
|---|---|---|---|---|---|
| 3,825,899 A | * | 7/1974 | Haeberle et al. | ............ | 370/324 |
| 4,888,769 A | * | 12/1989 | Deal | ............ | 370/321 |
| 5,172,375 A | * | 12/1992 | Kou | ............ | 370/322 |
| 5,550,831 A | * | 8/1996 | Tanahashi | ............ | 370/321 |
| 5,646,947 A | * | 7/1997 | Cooper et al. | ............ | 370/510 |
| 5,812,545 A | * | 9/1998 | Liebowitz et al. | ............ | 370/337 |
| 6,278,696 B1 | * | 8/2001 | Feldman et al. | ............ | 370/278 |

* cited by examiner

Primary Examiner—Phoung Phu
(74) Attorney, Agent, or Firm—Banner & Witcoff, Ltd.

(57) ABSTRACT

A set of formats and protocols is proposed for a satellite communications system. In these formats, a pilot signal (PS) is inserted after every 25 or 29 data symbols. The formats consist of SCPC frames (F) which may contain either data (D) and in-band signalling information (SU), or only signalling information (SU). In either case, the contents of each frame (F) are error-correction coded before transmission with the same coding rate. Each data frame (F) carries the data content of an integral number of input user data frames (M), each of which comprises four subframes. Different symbol transmission rates are used for different input data rates, the symbol transmission rates being selected so that their different synchronizing clock rates can easily be obtained from a common clock. Data bursts may be preceded by a constant power level preamble (P). The formats and protocols satisfy the requirements of a high data rate satellite communications system.

14 Claims, 13 Drawing Sheets

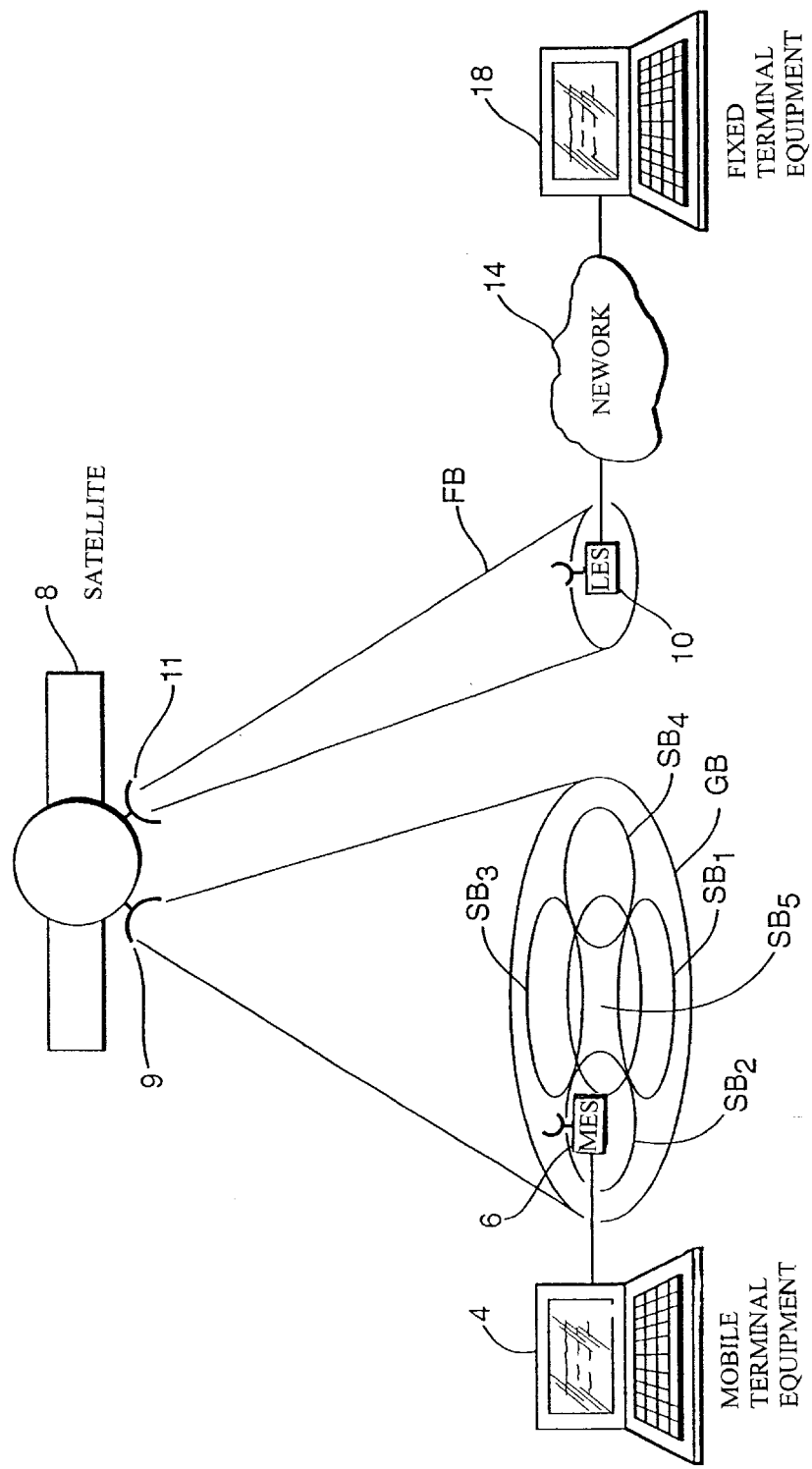

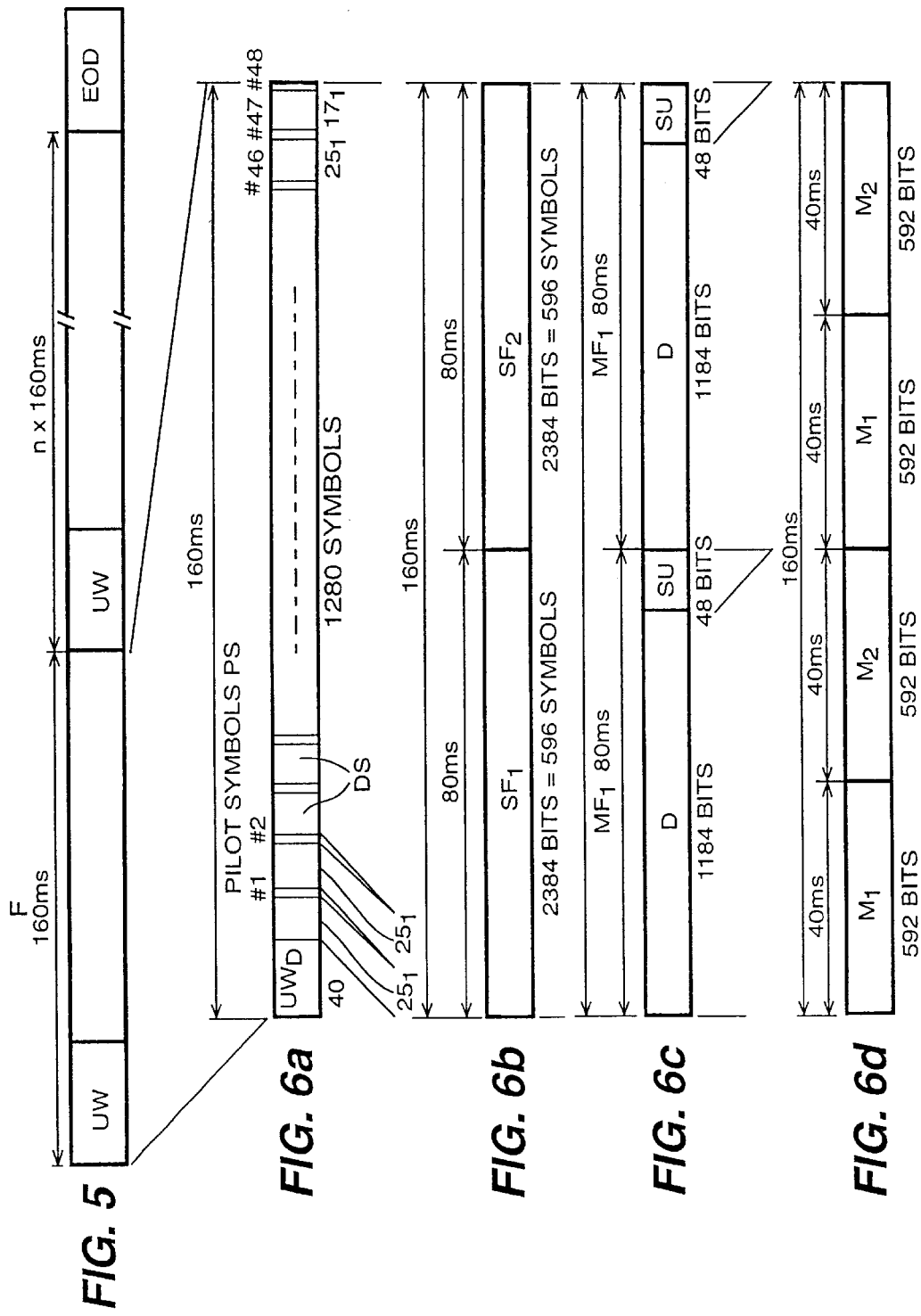

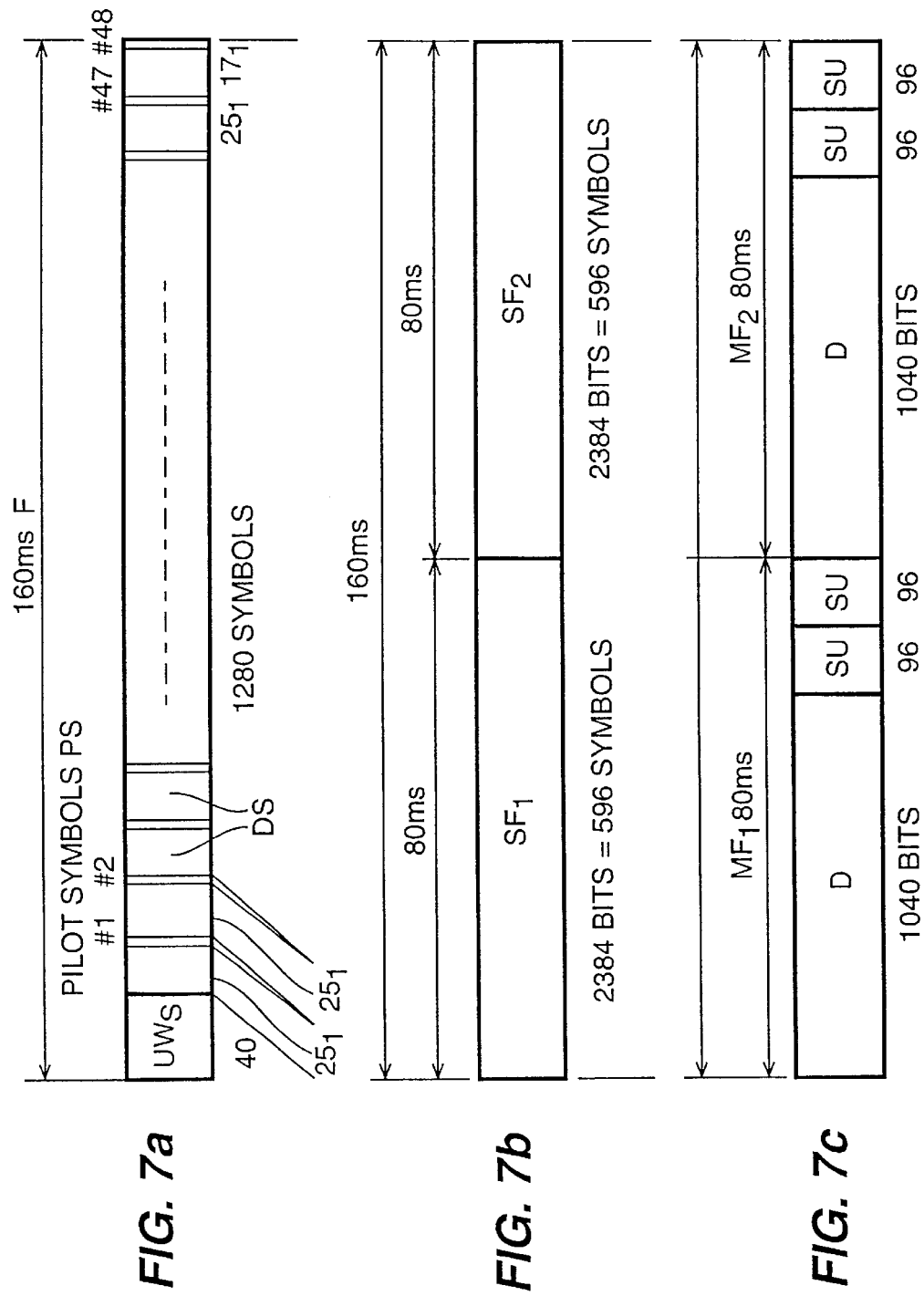

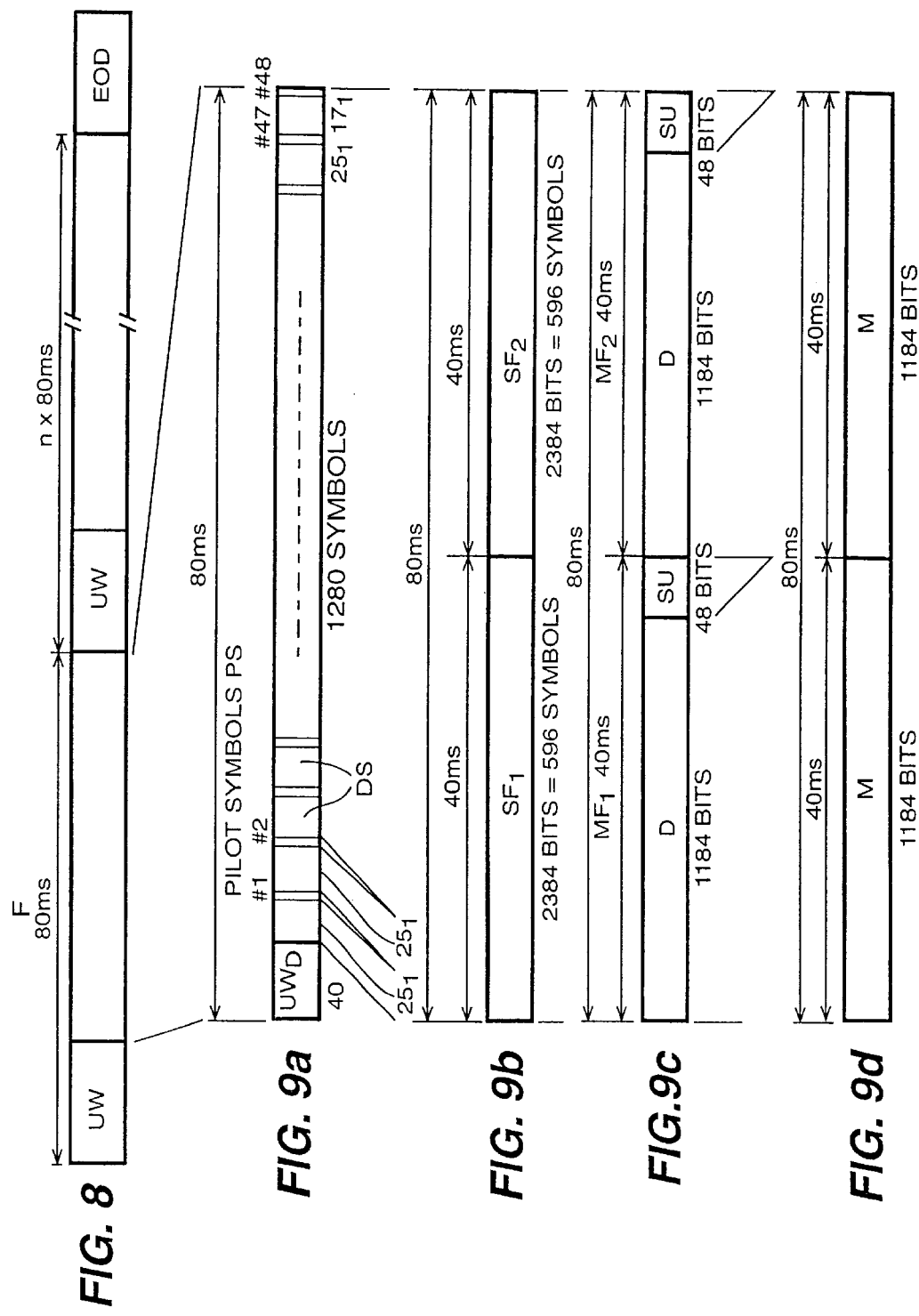

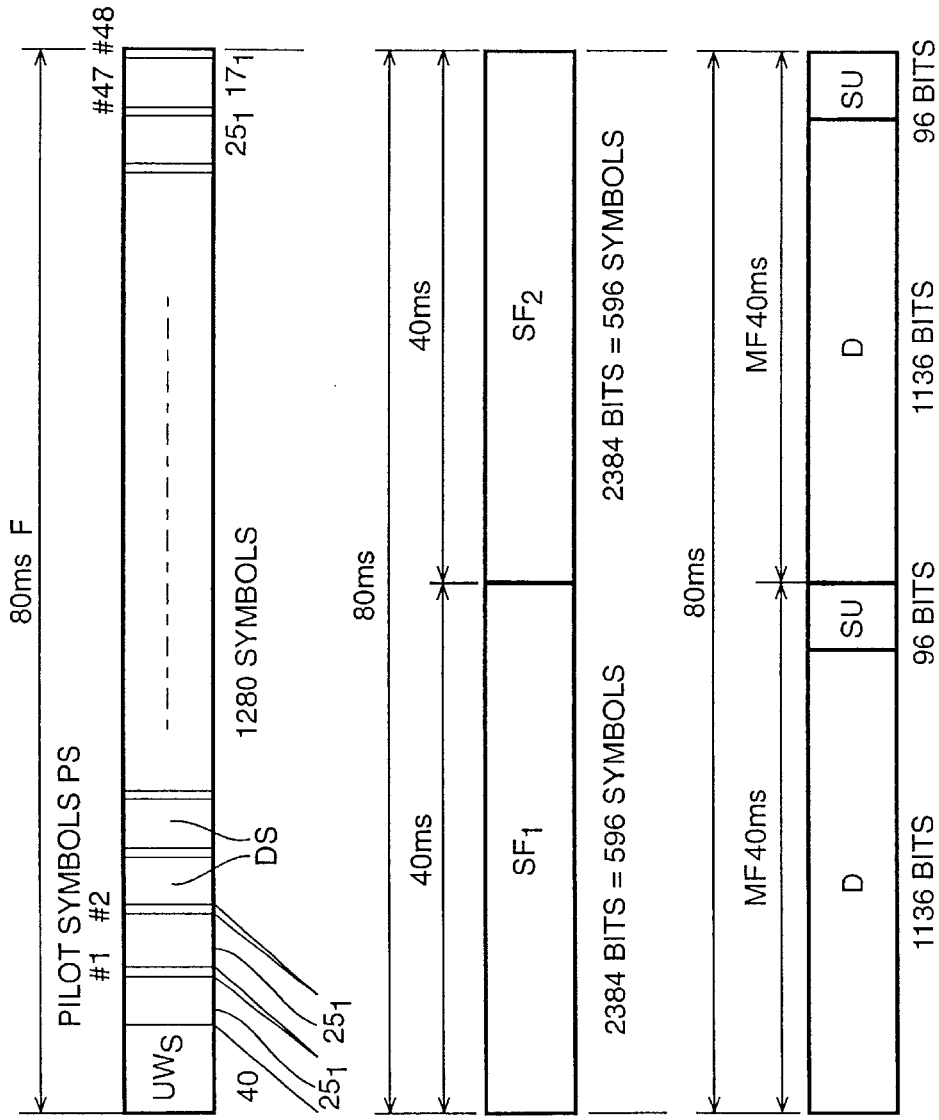

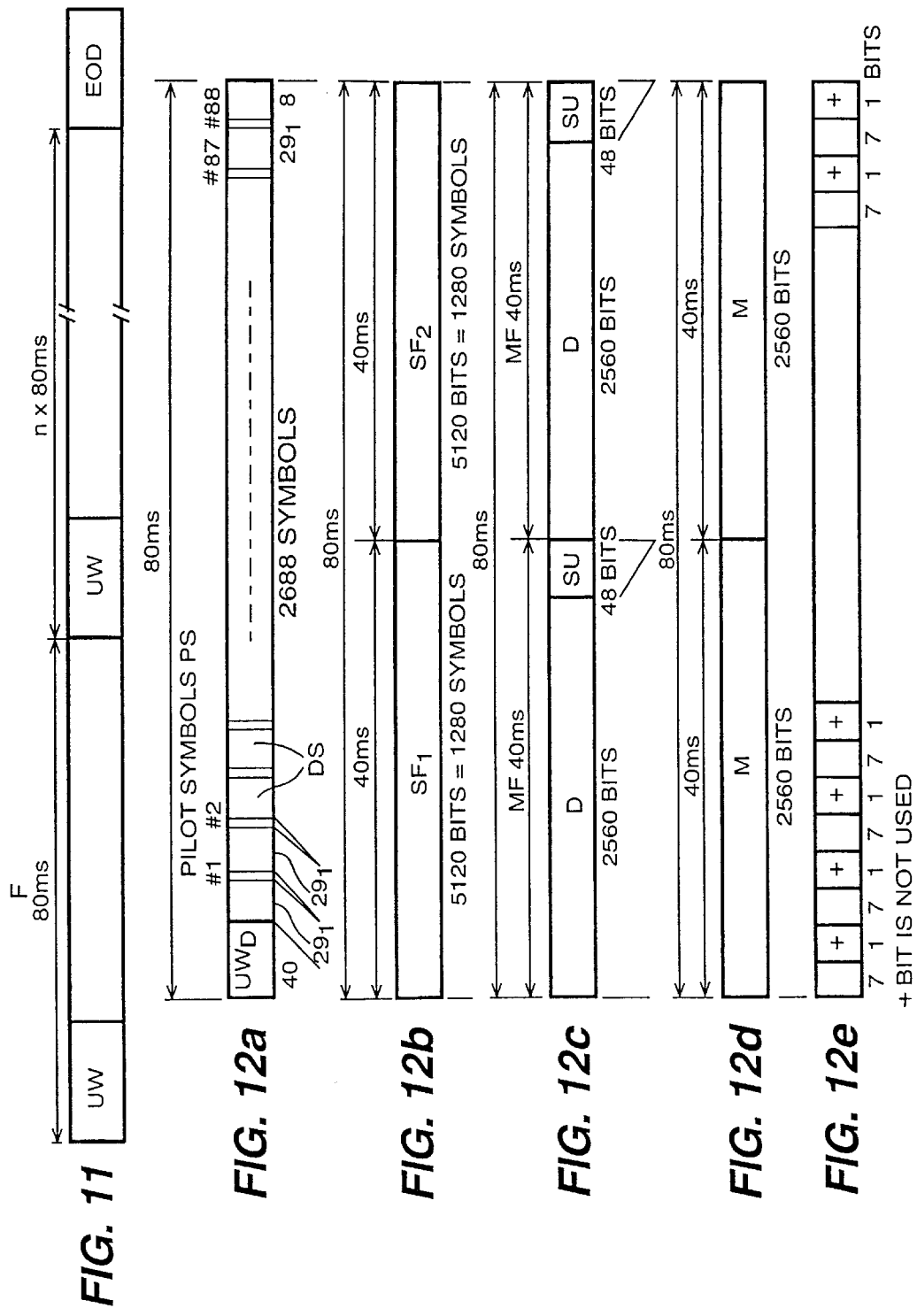

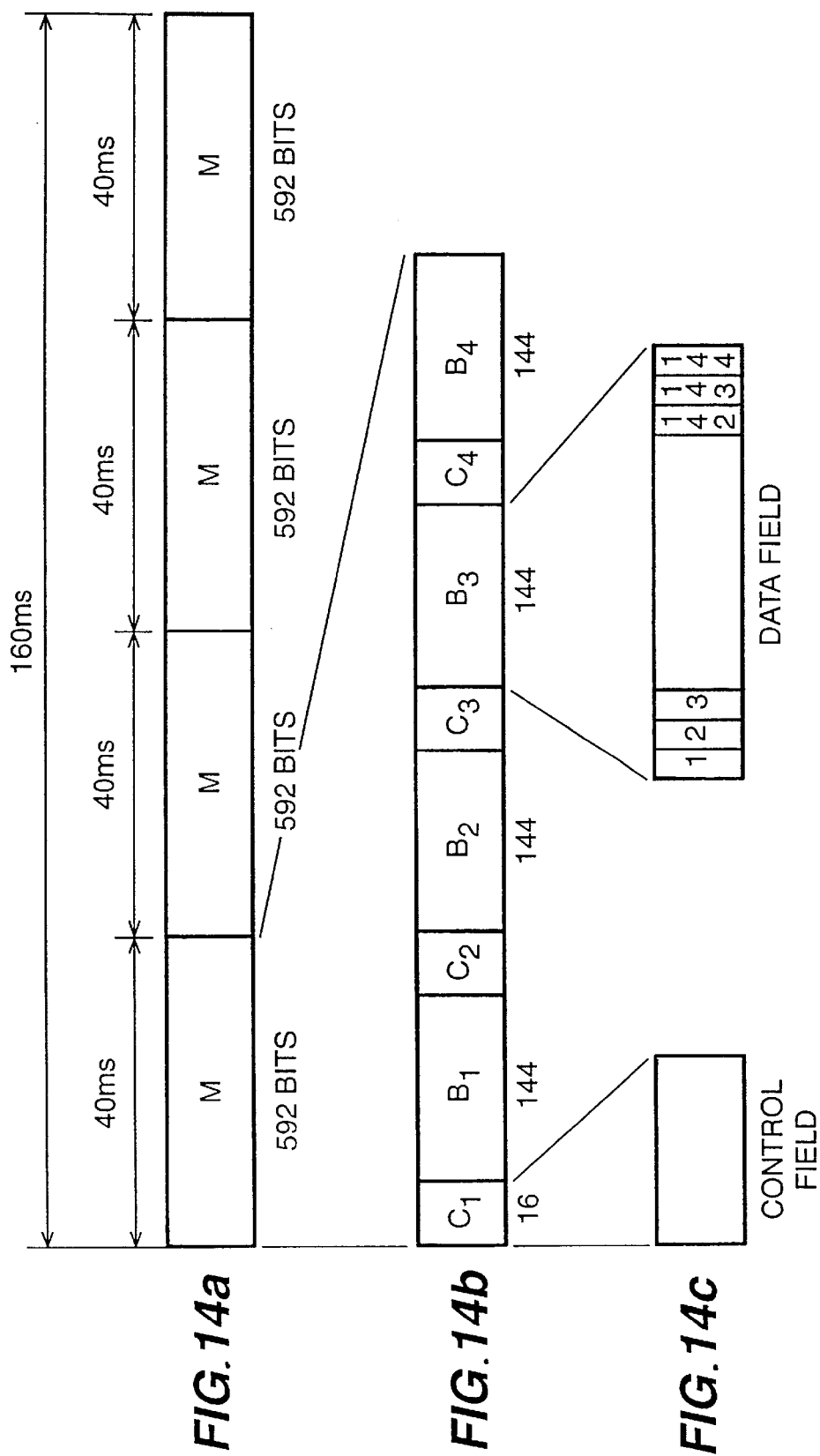

COMMUNICATION METHOD AND APPARATUS

FIELD OF THE INVENTION

The present invention relates to a communication method and apparatus, and in particular a method and apparatus for mobile satellite communication which provides a short processing delay, a high coding gain and efficient use of bandwidth.

BACKGROUND OF THE INVENTION

Voice, fax and data communication capabilities are available through mobile satellite communication systems. For example, the Inmarsat-M™ and Inmarsat mini-M™ systems support a data rate of 2.4 kbit/s, while the Inmarsat-B™ system provides data rates of up to 16 kbit/s. However, in terrestrial communications data rates of 28.8 kbit/s are commonly used over a PSTN under the ITU V.34 standard, and data rates of 56 or 64 kbit/s per channel are available over ISDN. Many internet-based and conferencing applications require the data rates available over terrestrial networks. Such applications cannot be used satisfactorily on conventional mobile satellite terminals.

Mobile satellite communication channels are subject to many different sources of noise as well as fading, particularly when the mobile terminal is moving. However, bit error rates of $10^{-6}$ or less are desirable if the service is to have performance comparable with terrestrial data communications, which limits the data rate operable on the satellite channel. The data can be encoded for error correction so as to reduce the bit error rate, but this also reduces the data rate.

SUMMARY OF THE INVENTION

Satellite communications typically involve much greater delay than terrestrial communications. As well as the propagation delay between an earth station and a satellite, delay is also incurred in formatting data into transmission frames and in encoding the data to provide error detection and correction. Complex coding and decoding algorithms can reduce the bit error rate of a satellite channel, but these algorithms generally involve buffering and intensive processing, which add to the delay. Excessive delay is inimical to real-time applications such as telephony and conferencing.

U.S. Pat. No. 5,568,483 describes a method for formatting data of different data rates for transmission over a transmission medium. European patent publication No. 0 676 875 A discloses a transmission method for wireless circuits such as satellite circuits, in which data is encoded at a variable rate depending on the priority of the data transmitted.

International patent publication No. WO 96/164492 discloses a wireless digital transmission technique in which pilot symbols are inserted periodically in a stream of data symbols.

According to one aspect of the present invention, there is provided a satellite communications technique in which a pilot symbol is transmitted after every 25 or 29 data symbols.

According to another aspect of the present invention, there is provided a method of transmitting both user data and in-band signalling information such that frames are transmitted containing either multiplexed user data and signalling information or multiplexed signalling information and dummy data, with the frame length being the same in either case.

According to another aspect of the present invention, there is provided a method of formatting user data, which is received in user data frames comprising four subframes each of equal length, into output frames each corresponding to an integral number of user data frames.

According to another aspect of the present invention, there is provided a satellite communications system in which data can be transmitted at any one of a plurality of different data rates, selected such that each of said data rates can be achieved by dividing a clock rate by only small prime numbers a small number of times.

It is one advantage of aspects of the present invention that low signalling overhead and wastage of bandwidth may be achieved. It is another advantage that a frame length is chosen to incur a low framing delay while having a sufficiently large frame to achieve a high error correction coding gain.

BRIEF DESCRIPTION OF THE DRAWINGS

Specific embodiments of the present invention will now be described with reference to the accompanying drawings, in which:

FIG. 1 is a schematic diagram of a satellite communications system;

FIG. 3 is a schematic diagram of a turbo encoder in the transmitter of FIG. 2a;

FIG. 4 is a diagram of the modulation scheme implemented by the modulator in FIG. 2a;

FIG. 5 is a diagram of the frame format used for communication between the earth stations in a first embodiment of the present invention;

FIGS. 6a to 6d are diagrams showing details of the frame format of FIG. 5 in a data transmission mode;

FIGS. 7a to 7c are diagrams showing details of the frame format of FIG. 5 in a signalling mode;

FIG. 8 is a diagram of the frame format used for communication between the earth stations in a second embodiment of the present invention;

FIGS. 9a to 9d are diagrams showing details of the frame format of FIG. 8 in a data transmission mode;

FIGS. 10a to 10c are diagrams showing details of the frame format of FIG. 8 in a signalling mode;

FIG. 11 is a diagram of the frame format used for communication between the earth stations in a third embodiment of the present invention;

FIGS. 12a to 12e are diagrams showing details of the frame format of FIG. 11 in a data transmission mode;

FIGS. 14a to 14c are diagrams showing the format of MIU frames in the first embodiment when applied to facsimile transmission;

DETAILED DESCRIPTION OF THE INVENTION

Figure 2A:
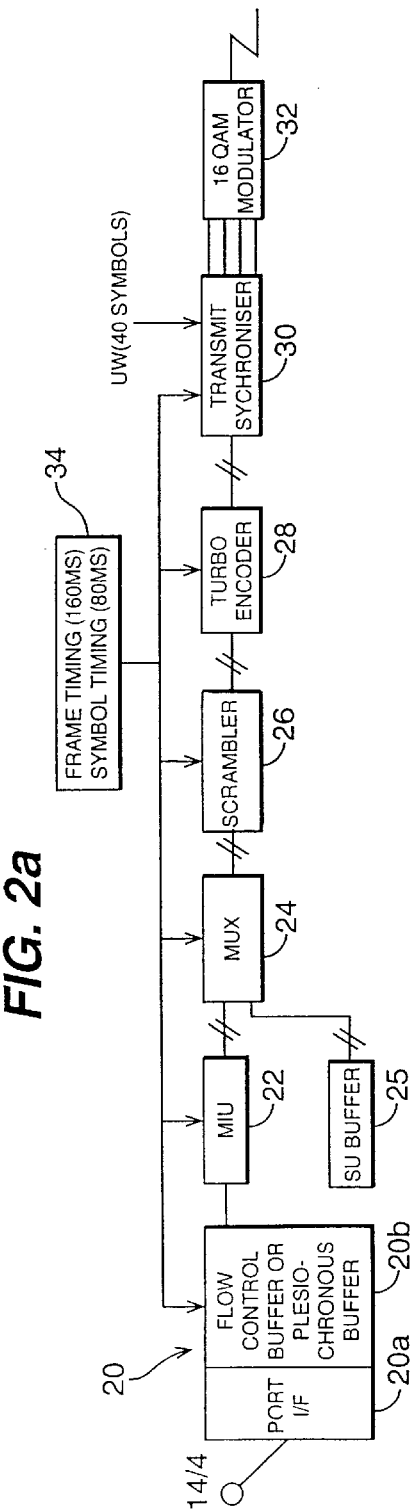
FIG. 2a is a schematic diagram of a transmitter in the system of FIG. 1.

As shown in FIG. 1, mobile terminal equipment 4 is connected to a mobile earth station (MES) 6. The mobile terminal equipment 4 sends digital data to the MES 6 for RF modulation and transmission to a satellite 8, and the MES 6 receives and demodulates digital data from the satellite 8, the demodulated data then being sent to the mobile terminal equipment 4.

The satellite 8 carries a multibeam antenna 9 which generates a plurality of spot beams $SB_1$ to $SB_5$ for transmission and reception of signals over a user link, together with a global beam GB which covers the coverage areas of all the spot beams SB. The satellite 8 also carries a feeder link antenna 11 which generates a feeder link beam FB directed towards a land earth station (LES) 10, for transmission and reception of signals over a feeder link.

The satellite 8 carries transponders which receive modulated signals in each of the spot beams SB and the global beam GB, convert them to an intermediate frequency, amplify them and retransmit them at a different frequency from the received frequency in the feeder link beam FB. Likewise, signals transmitted by the LES 10 in the feeder link beam FB are retransmitted at a different frequency in one of the spot beams B or the global beam GB. The satellite 8 thereby links the MES 6 to the LES 10, so that signals transmitted by the MES 6 are received by the LES 10 and vice versa, via the satellite 8.

During call set-up, signals are transmitted and received by the MES 6 in the global beam GB, and channels are assigned in one of the spot beams SB in which the MES 6 is located. Transmission and reception of user data then takes place in the spot beam channels. Examples of such arrangements are the Inmarsat-3™ satellites which support the Inmarsat mini-M™ service.

The LES 10 is connected through a network 14, in this case a PSTN, to fixed terminal equipment 18, which comprises telephone, facsimile or data terminal equipment compatible with the mobile terminal equipment 4, together with a suitable interface to the network 14, such as a PSTN modem. The network 14 may alternatively be an ISDN (Integrated Services Digital Network).

FIG. 2a shows the relevant functional sections of a transmitter section of the MES 6 and the LES 10. The functions of the MES 6 and the LES 10 are distinct in other respects, but for convenience the same diagram and reference numerals are used for the relevant sections of each. Parallel data connections are shown by double diagonal lines.

An interface portion 20 comprises a port interface 20a for connection to the network 14 or to the mobile terminal equipment 4. The port interface 20a comprises a physical connector appropriate to the connection, such as an RJ11 connector for two-wire analogue connection or an RS-232C connector for digital connection. If the connection is analogue, a demodulator is also included in the port interface 20a. The interface portion 20 also includes a buffer 20b to permit flow control and/or plesiochronous buffering. Data is output from the interface portion 20 to a modem interface unit (MIU) 22 which implements communications protocols compatible with those of the mobile terminal equipment 4 and the fixed terminal equipment 18. For example, the MIU 22 may implement facsimile protocols compatible with ITU Recommendation T.30. If the network 14 is an ISDN, the MIU 22 may translate ISDN signalling messages to satellite signalling messages.

Data is output from the MIU 22 to a multiplexer 24 where the data is multiplexed with signalling information input from a signalling unit buffer 25 The output of the multiplexer 24 is scrambled by a scrambler 26 using a scrambling vector determined during call set-up and encoded by a encoder 28. The encoder 28 implements a parallel concatenated convolutional code known as a 'Turbo' code, which provides a type of forward error correction particularly well suited to digital radio frequency transmission. The encoder is shown in more detail in FIG. 3. The data and parity bits output by the encoder 28 are buffered by a transmit synchroniser 30 and output as sets of four bits to a 16QAM (16 state quadrature amplitude modulation) modulator 32, which modulates each set of four bits as one 16QAM symbol. The transmit synchroniser also receives data sets which comprise a unique word (UW) of 40 symbols. The 16QAM symbols are transmitted to the satellite 8, with the unique word being transmitted at the beginning of a data transmission in order to identify the channel to the receiver.

The timing of the transmitter is controlled by a clock 34, which provides frame and symbol timing signals to the portions of the transmitter.

Figure 2B:
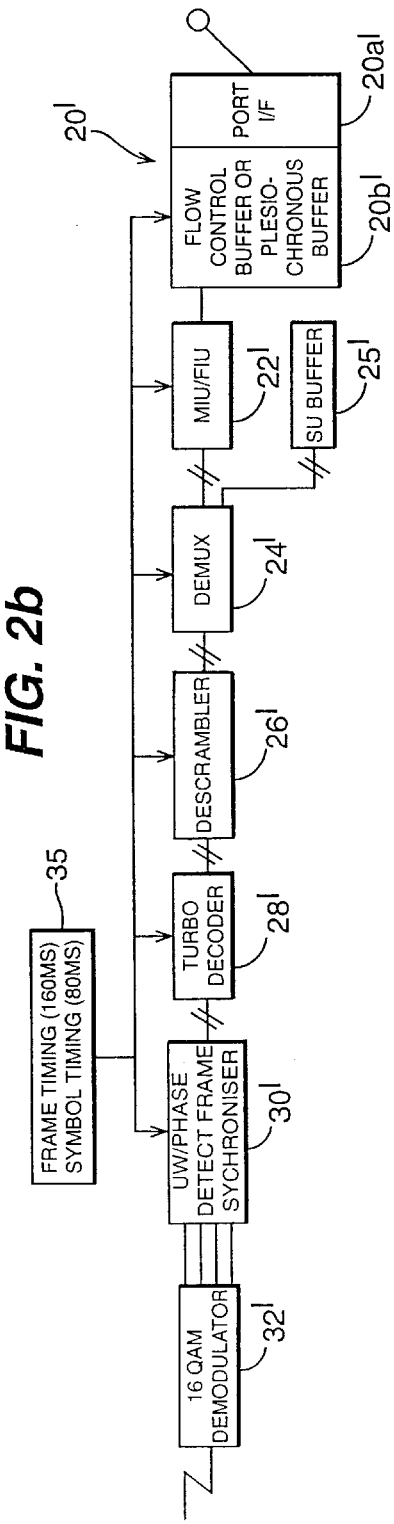
FIG. 2b is a schematic diagram of a receiver in the system of FIG. 1.

FIG. 2b shows the relevant functional sections of a receiver section of the MES 6 and the LES 10. The functions of the MES 6 and the LES 10 are distinct in other respects, but for convenience the same diagram and reference numerals are used for the relevant sections of each. The functions of the receiver portion are the inverse of corresponding functions of the transmitter portion shown in FIG. 2a and the same reference numerals are therefore used, with a dash to denote the inverse, in FIG. 2b.

Symbols received from the satellite 8 are demodulated by a 16QAM demodulator 32' and output as four bits to a phase/unique word detector 30' which acquires the phase and frame timing of the received signal, as well as detecting the unique word. The received data is decoded by a decoder 28', which decodes the turbo encoded data using a MAP (maximum a priori) or SOVA (soft output Viterbi algorithm) decoder. The decoded data is descrambled by a descrambler 26', using the inverse of a scrambling vector used by the scrambler 26. The descrambled data is demultiplexed by a demultiplexer 24' which demultiplexes user data from signalling information, the latter being stored in a signalling unit buffer 25'. The data is sent through a modem interface unit 22' to an interface portion 20' for connection to the network 14 or mobile terminal equipment 4. The interface portion 20' comprises a port interface 20a' and a buffer 20b'.

A clock 35 provides frame and symbol synchronisation signals to the different parts of the receiver.

Figure 3:
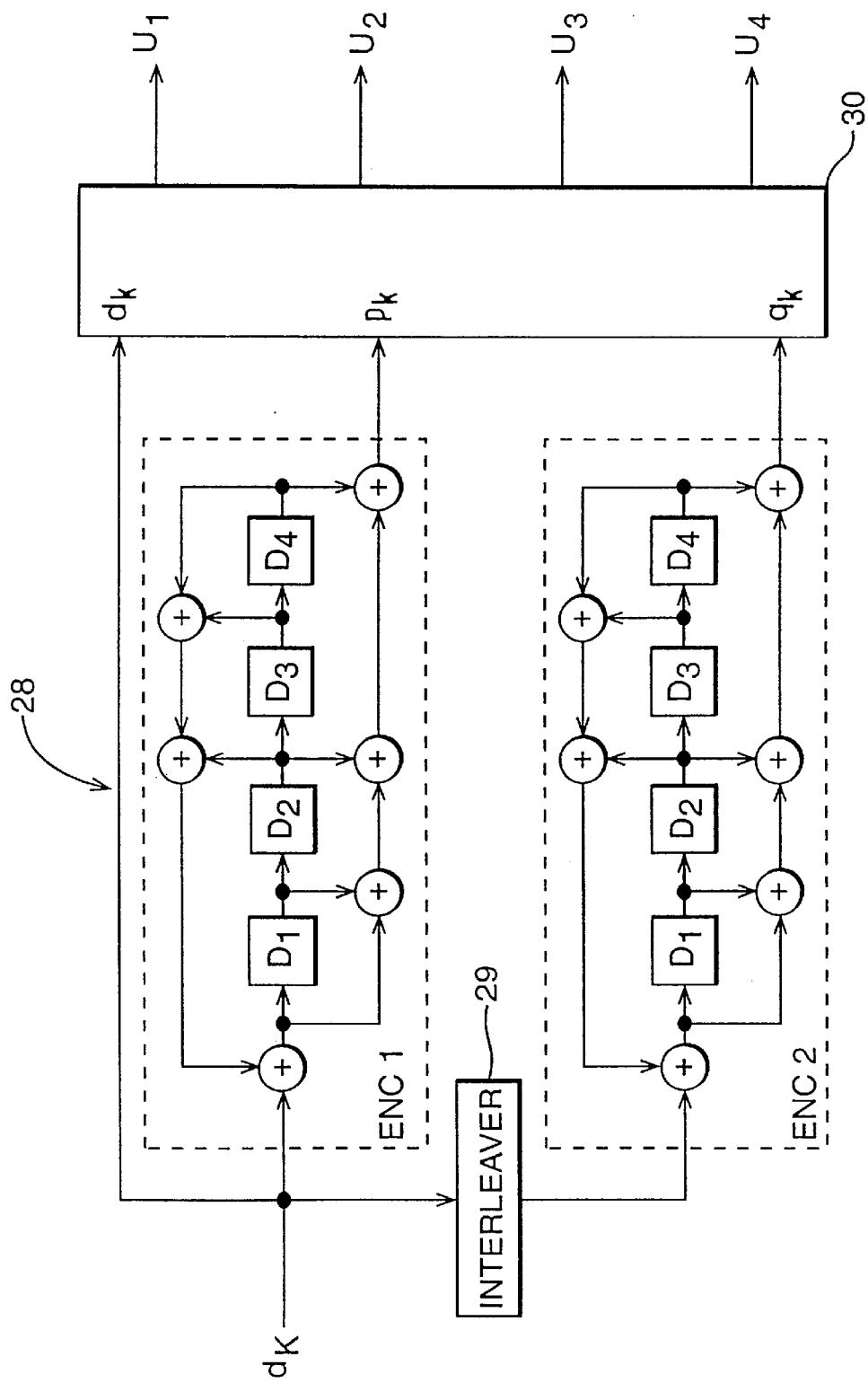

An example of a Turbo encoder suitable for use in the encoder 28 is shown in FIG. 3. Data bits $d_k$ are input to a first encoder ENC1, and to an interleaver 29, the output of which is connected to a second encoder ENC2. Each encoder ENC1 and ENC2 is a recursive convolutional coder comprising four intermediate binary stores D1 to D4, and binary adders or exclusive-OR gates. With each cycle, the contents of each of the binary stores D1 to D3 is shifted to binary stores D2 to D4 respectively, while the new contents of D1 are derived from the previous contents of D2 to D4. The output $p_k$ from the first encoder and the output $q_k$ from the second encoder are derived from the contents of the binary stores D1, D2 and D4 and from the input to the binary store D1.

The data bits $d_k$, the non-interleaved parity bits $p_k$ and the interleaved parity bits $q_k$ are output to the transmit synchroniser 30 from which sets of bits ($u_1$, $u_2$, $u_3$, $u_4$) are output in parallel in accordance with a puncturing format, in which only some of the parity bits are output. In some of the sets of bits, two data bits $d_k$ and two parity bits $p_k$ or $q_k$ are output, giving a half-rate code. In others of the sets three data bits $d_k$ and one parity bit $p_k$ or $q_k$ are output, giving a three-quarter rate code. The proportion of half and three-quarter rate coded sets is arranged to give a predetermined coding rate.

Each set of bits is modulated as one symbol by the 16QAM modulator 32. Each symbol is formed from the four bits ($u_1$, $u_2$, $u_3$, $u_4$) with the bits $u_1$, $u_2$ modulating the I (amplitude) component and the bits $u_3$, $u_4$ modulating the Q (phase) component such that:

$$A_i = [u_1, u_2] \to I$$

$$B_j = [u_3, u_4] \to Q$$

Figure 4:
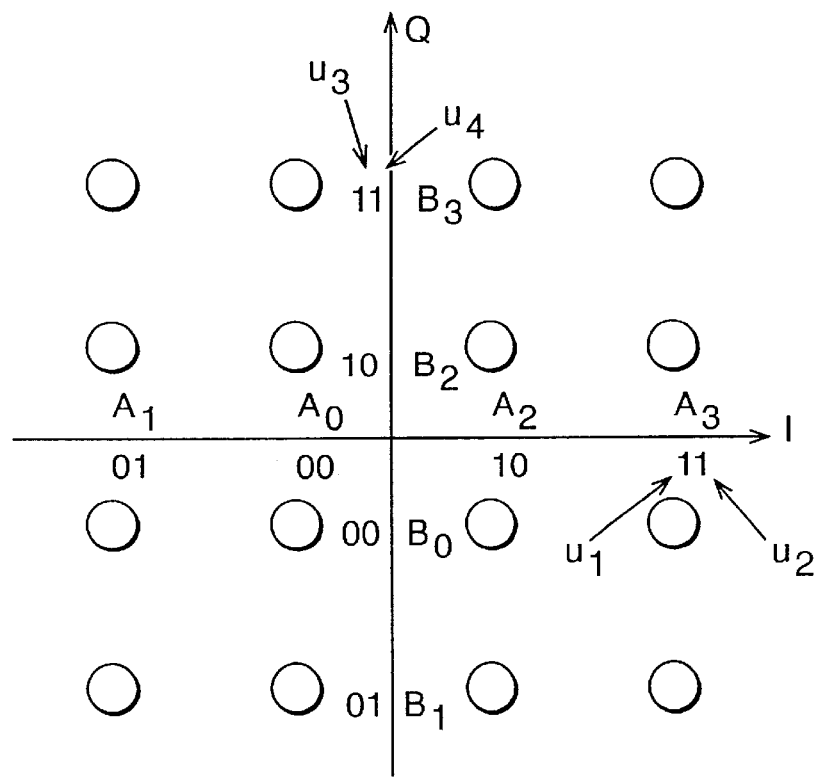

The modulation scheme, as shown in FIG. 4, is square 16QAM, although a circular 16QAM scheme may be used. The data bits $u_1$, $u_3$ are the most protected in the 16QAM symbol. The constellation mapping is summarised in Table 1 below, where D is the minimum distance between points.

TABLE 1

| I1 | I0 | Q1 | Q0 | I | Q |
|----|----|----|----|------|------|
| 0 | 1 | 0 | 1 | -3D/2 | 3D/2 |
| 0 | 1 | 0 | 0 | -3D/2 | -D/2 |
| 0 | 1 | 1 | 0 | -3D/2 | D/2 |
| 0 | 1 | 1 | 1 | -3D/2 | 3D/2 |
| 0 | 0 | 0 | 1 | -D/2 | -3D/2 |
| 0 | 0 | 0 | 0 | -D/2 | -D/2 |
| 0 | 0 | 1 | 0 | -D/2 | D/2 |
| 0 | 0 | 1 | 1 | -D/2 | 3D/2 |
| 1 | 0 | 0 | 1 | D/2 | -3D/2 |
| 1 | 0 | 0 | 0 | D/2 | -D/2 |
| 1 | 0 | 1 | 0 | D/2 | D/2 |
| 1 | 0 | 1 | 1 | D/2 | 3D/2 |
| 1 | 1 | 0 | 1 | 3D/2 | -3D/2 |
| 1 | 1 | 0 | 0 | 3D/2 | -D/2 |
| 1 | 1 | 1 | 0 | 3D/2 | D/2 |
| 1 | 1 | 1 | 1 | 3D/2 | 3D/2 |

In a first embodiment of the present invention, a user data rate of 14.4 kbit/s is supported in a single channel per carrier (SCPC) frame format as shown in FIG. 5. Each frame F carries a header containing a unique word (UW), comprising a predetermined sequence of 40 symbols, to assist in acquiring the signal and determining the signal type. The unique word symbols comprise only two bits, mapped onto the most protected bits $u_1$, $U_3$ of the 16 QAM constellation.

The duration of each frame is 160 ms. The end of a sequence of frames is indicated by an end of data (EOD) signal. The format of the body of the frame differs depending on whether data or signalling is being transmitted.

FIG. 6a shows the frame format input to the modulator 32 in a data mode, in which data is transmitted between the mobile terminal equipment 4 and the fixed terminal equipment 18. The unique word comprises a data unique word $UW_D$ which indicates that the body of the frame F contains user data. The body of the frame comprises 47 sequences of 25 data symbols DS each followed by one pilot symbol PS, and a final sequence of 17 data symbols followed by one pilot symbol PS. The pilot symbols allow measurement of fading and noise variance, so as to assist in decoding of the turbo codes. Thus, each frame contains 1192 data symbols, 48 pilot symbols and 40 unique word symbols.

As shown in FIG. 6b, the data symbols in each frame comprise two subframes $SF_1$ and $SF_2$ each comprising 596 symbols of encoded data generated by the encoder 28. As shown in FIG. 6c, each subframe SF is generated by the encoder 28 from a corresponding multiplexed frame $MF_1$, $MF_2$ output from the multiplexer 24 through the scrambler 26, comprising 1184 data bits D and 48 signalling unit bits SU. As shown in FIG. 6d, each set of data bits D in each multiplexed frame MF comprises two MIU frames $M_1$, $M_2$ output by the MIU 22, each comprising 592 bits. Hence, 2368 data bits are transmitted every 160 ms, giving a user data rate of 14.8 kbit/s.

The size of the interleaver 29 of the encoder 28 is equal to that of each of the multiplexed frames $MF_1$ and $MF_2$. In one example, the interleaver 29 is a random interleaver in which an entire multiplexed frame MF is loaded into the interleaver 29 and the contents are then output in a pseudo-random order to the second encoder ENC2 to generate the interleaved parity bits q for the encoded subframe SF. The encoders ENC1 and ENC2 are reset for each new multiplexed frame MF.

FIG. 7a shows the format of the frame of FIG. 5 in an in-band signalling mode. The format is similar to that shown in FIG. 6a, except that the unique word comprises a signalling unique word $UW_S$ different from the data unique word $UW_D$, to indicate that the body of the frame contains signalling information only. FIG. 7b shows that the frame F comprises two sub-frames $SF_1$ and $SF_2$, as in FIG. 6b. However, the multiplexed frames $MF_1$, $MF_2$ shown in FIG. 7c differ from those of FIG. 6c in that the data bits D comprise 1040 dummy bits generated by the multiplexer 24 and not carrying any user data. The multiplexed frame MF carries two signalling unit slots $SU_1$ and $SU_2$ each comprising 96 bits of signalling information. Each signalling unit slot SU is used in the in-band signalling mode to transmit signalling messages during call set-up and clearing.

In a second embodiment of the present invention, a user data rate of 28.8 kbit/s is supported. Similar formats to those of the first embodiment are indicated by the same references. The frame structure is shown in FIG. 8, which is similar to that of FIG. 5 except that the frame duration is 80 ms instead of 160 ms.

FIGS. 9a to 9c show formats for a data transmission mode similar to those of FIGS. 6a to 6c, except that the durations of the subframes SF and multiplexed frames MF are halved, although the number of bits therein remains the same. However, the format shown in FIG. 9d differs from that shown in FIG. 6d, in that the data bits D of each multiplexed frame comprise only one MIU frame M of 1184 bits. Hence, 2368 bits of user data are transmitted every 80 ms, giving a data rate of 29.6 kbit/s, sufficient to support a user data rate of 28.8 kbit/s.

FIGS. 10a and 10b show formats for an in-band signalling mode similar to those of FIGS. 7a and 7b, except that the durations of the frames F and subframes SF are halved. However, the format of FIG. 10c differs from that of FIG. 7c in that each multiplexed frame MF comprises 1136 dummy data bits D and one signalling unit slot SU of 96 bits. This gives the same signalling rate as the first embodiment in in-band signalling mode.

In a third embodiment of the present invention, a user rate of 56 or 64 kbit/s is supported, which is compatible with a single ISDN channel. FIG. 11 shows the frame structure, which is similar to that shown in FIG. 8.

FIG. 12a shows the frame format in a data transmission mode. The format differs from that of FIG. 10a in that 2688 symbols are transmitted in each frame F. The data unique word $UW_D$ occupies the first 40 symbols, while the remainder of the frame comprises 88 sets of 29 symbols each followed by a pilot symbol PS, followed by the last set which comprises only 8 symbols and no pilot symbol. As shown in FIG. 12b, the subframes SF each comprise 5120 bits which are modulated as 1280 symbols. As shown in FIG. 12c, each multiplexed frame MF comprises 2560 data bits D and 48 signalling unit bits SU. As shown in FIG. 12d, the data bits D are input as one frame M from the network 14 or mobile terminal equipment 4.

In this embodiment, 5120 bits are transmitted every 80 ms, giving a user data rate of 64 kbit/s. Where the network 14 or mobile terminal 4 transmits at 56 kbit/s, every eighth data bit D is unused, as shown in FIG. 12e.

Figure 13A:
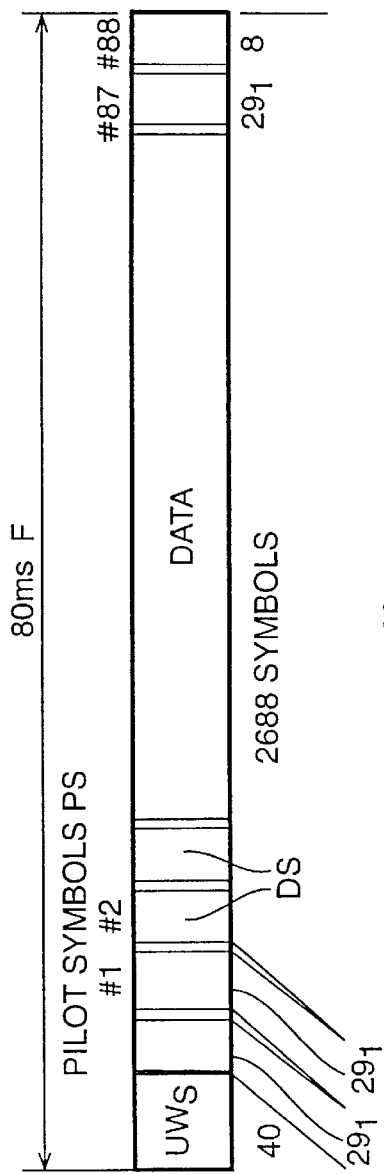
FIGS. 13a to 13c are diagrams showing details of the frame format of FIG. 11 in a signalling mode.
Figure 13B:
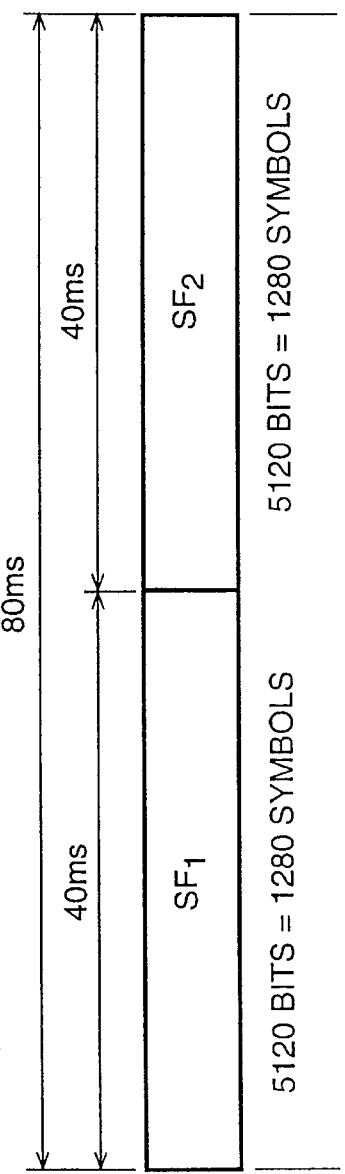
Figure 13C:
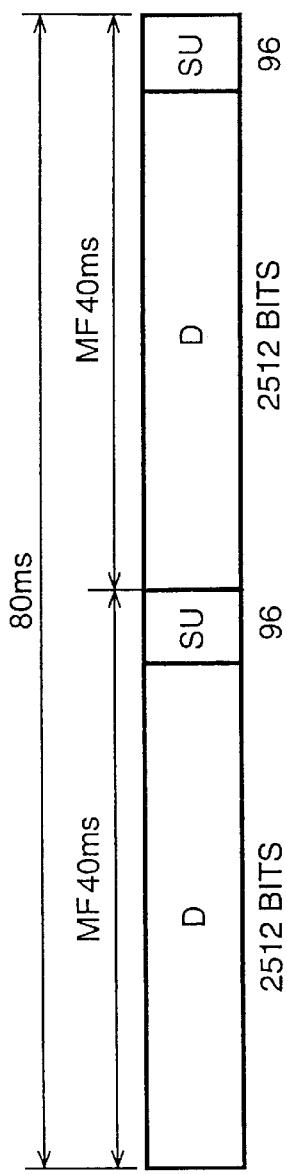

FIG. 13a shows the frame format in an in-band signalling mode of the third embodiment. The symbol format is the same as that shown in FIG. 12a, except that the signalling unique word UWS is transmitted instead of the data unique word $UW_D$. As shown in FIG. 13b, the frame F is divided into two sub-frames $SF_1$ and $SF_2$, in the same way as shown in FIG. 12b. As shown in FIG. 13c, each multiplexed frame MF comprises a data slot D of 2512 dummy bits and a signalling unit slot SU of 96 bits.

The features of the formats of the embodiments are summarised in Table 2 below.

TABLE 2

| Embodiment | 1 | 2 | 3 |
| --- | --- | --- | --- |
| Supported Data Rate (kbit/s) | 14.4 | 28.8 | 56/64 |
| Modulation Scheme | 16QAM | 16QAM | 16QAM |
| Data Rate (kbit/s) | 14.8 | 29.6 | 64 |
| Signalling Rate (kbit/s) | 0.6 | 1.2 | 1.2 |
| Total bit rate (kbit/s) | 15.4 | 30.8 | 65.2 |
| MIU frame length (ms) | 40 | 40 | 40 |
| MIU frame size (bits) | 592 | 1184 | 5120 |
| Subframe SF length (ms) | 80 | 40 | 40 |
| Data bits per subframe SF | 1184 | 1184 | 2560 |
| Signalling bits per subframe SF | 48 | 48 | 96 |
| Input bits per subframe SF | 1232 | 1232 | 2608 |
| Coding rate | 0.516778 | 0.516778 | 0.509375 |
| Output bits per subframe SF | 2384 | 2384 | 5120 |
| Output symbols per subframe SF | 596 | 596 | 1280 |
| Frame F length (ms) | 160 | 80 | 80 |
| Data symbols per frame F | 1192 | 1192 | 2560 |
| Pilot symbol Insertion Ratio | 1/26* | 1/26* | 1/30† |
| Pilot symbols per frame F | 48 | 48 | 88 |
| Unique Word length (symbols) | 40 | 40 | 40 |
| Frame size (symbols) | 1280 | 1280 | 2688 |
| Symbol Rate (ksymbols/s) | 8 | 16 | 33.6 |

*1 pilot symbol after every 25 data symbols
†1 pilot symbol after every 29 data symbols The transmitter and receiver portions of the MES 6 and of the LES 10 are preferably operable in any one of a plurality of different modes corresponding to ones of the embodiments described above. For example, the transmitter and receiver portions may support rates of both 14.4 kbit/s and 28.8 kbit/s over the satellite link, the rate being selected during call set-up.

The symbol rates of 8, 16 and 33.6 ksymbols/s have been selected so that the transmitter clock 34 and receiver clock 35 can be designed with an internal clock rate which can easily be divided to produce synchronizing clock pulses at 8, 16 and 33.6 kHz. The lowest common multiple of these clock rates is 336 kHz, and if this is set as the internal clock rate, division by 42, 21 and 10 respectively is required. Suitable dividers can easily be implemented in hardware by means of a small number of divisions by prime numbers up to 7.

The input data rates of 14.4, 28.8, 56 and 64 kbit/s have a lowest common multiple of 4032 kbit/s. If the symbol rates were proportional to the input data rates, the internal clock rate of the transmitter clock 34 and of the receiver clock 35 would have to be divided by 280, 140, 72 and 63 respectively.

Thus, by varying the coding rate for different input data rates and by appropriate selection of frame formats, the design requirements of the transmitter and receiver clocks are simplified.

Facsimile Application

Applications of the above embodiments to facsimile communications will now be described with reference to FIGS. 14a to 14c and 15a to 15c. In this case, the mobile terminal equipment 4 and the fixed terminal equipment 18 comprise a facsimile terminal or a computer implementing facsimile protocols such as ITU Recommendation T.30.

FIG. 14a shows the MIU frames M as shown in FIG. 6d, each comprising 592 bits. As shown in FIG. 14b, each MIU frame is subdivided into four blocks each comprising a control field $C_1$ to $C_4$ of 16 bits and a data block $B_1$ to $B_4$ of 144 bits.

Figures 15A, 15B, 15C:
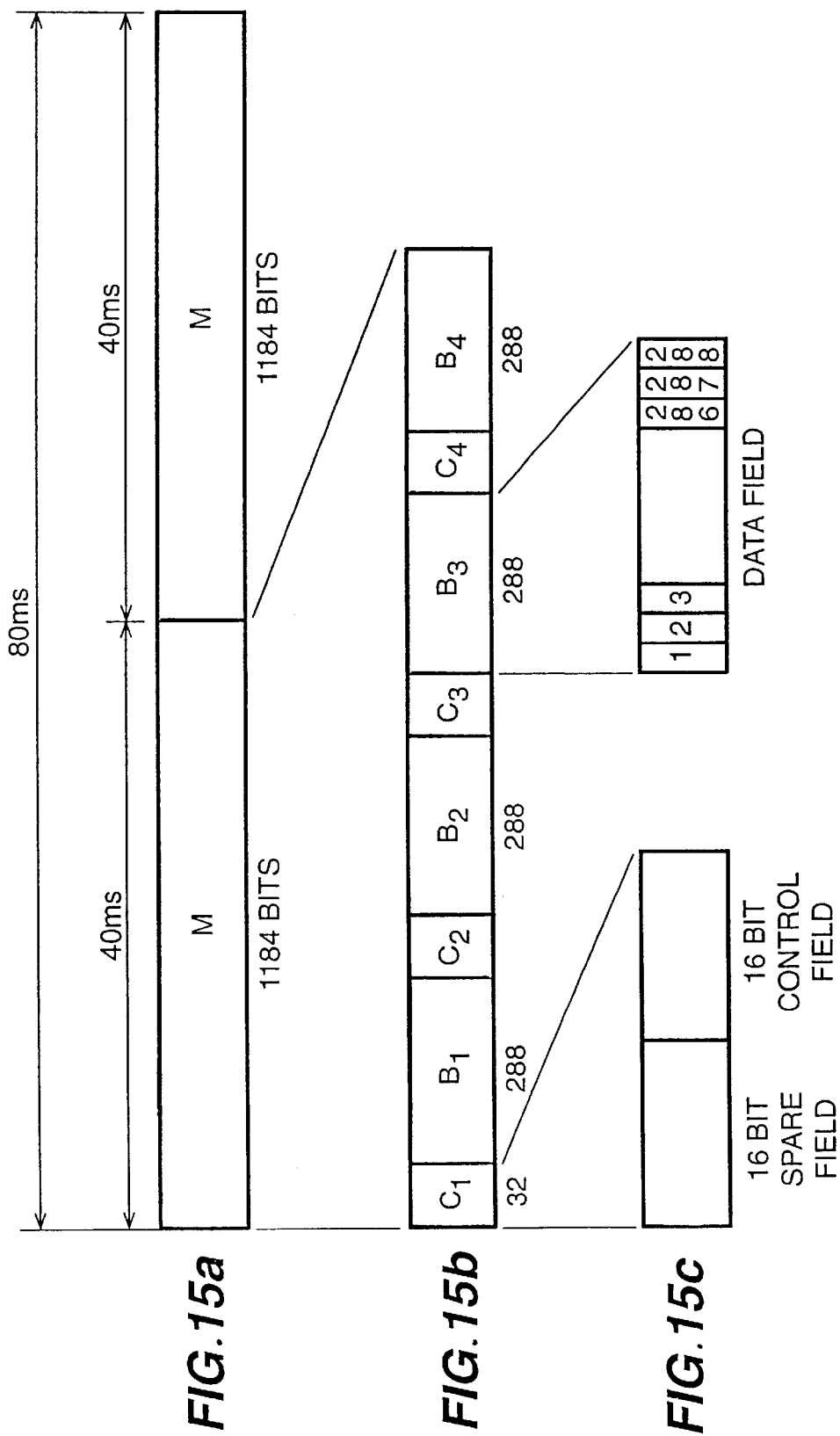
FIGS. 15a to 15c are diagrams showing the format of MIU frames when applied to facsimile or multimedia transmission in the second embodiment.

FIG. 15a shows the MIU frames M as shown in FIG. 9d, each comprising 1184 bits. As shown in FIG. 15b, each MIU frame is subdivided into four blocks each comprising a control field $C_1$ to $C_4$ of 32 bits and a data block $B_1$ to $B_4$ of 288 bits. As shown in FIG. 15c, each control field C is subdivided into a 16 bit spare field and a 16 bit control field.

The numbering of the bits used in each data block B for different end-to-end facsimile data rates are given below in Table 3. The other bits are not used.

TABLE 3

| Fax Data Rate (kbit/s) | Embodiment 1 | Embodiment 2 |
| --- | --- | --- |
| 0.3 | 6k + n; k = 0 to 23; n = 1* | 12k + n; k = 0 to 23; n = 1* |
| 2.4 | 6k + n; k = 0 to 23; n = 1 | 12k + n; k = 0 to 23; n = 1 |
| 4.8 | 3k + n; k = 0 to 47; n = 1 | 6k + n; k = 0 to 47; n = 1 |
| 7.2 | 2k + n; k = 0 to 71; n = 1 | 4k + n; k = 0 to 71; n = 1 |
| 9.6 | 3k + n; k = 0 to 47; n = 1 to 2 | 3k + n; k = 0 to 95; n = 1 |
| 12 | 6k + n; k = 0 to 23; n = 1 to 5 | 12k + n; k = 0 to 23; n = 1 to 5 |
| 14.4 | all slots | 2k + n; k = 0 to 143; n = 1 |
| 16.8 | N/A | 12k + n; k = 0 to 23; n = 1 to 7 |
| 19.2 | N/A | 3k + n; k = 0 to 95; n = 1 to 2 |
| 21.6 | N/A | 4k + n; k = 0 to 71; n = 1 to 3 |
| 24 | N/A | 6k + n; k = 0 to 47; n = 1 to 5 |
| 26.4 | N/A | 12k + n; k = 0 to 23; n = 1 to 11 |
| 28.8 | N/A | all slots |

*Each bit is repeated 8 times

Multimedia Application

Figure 16:
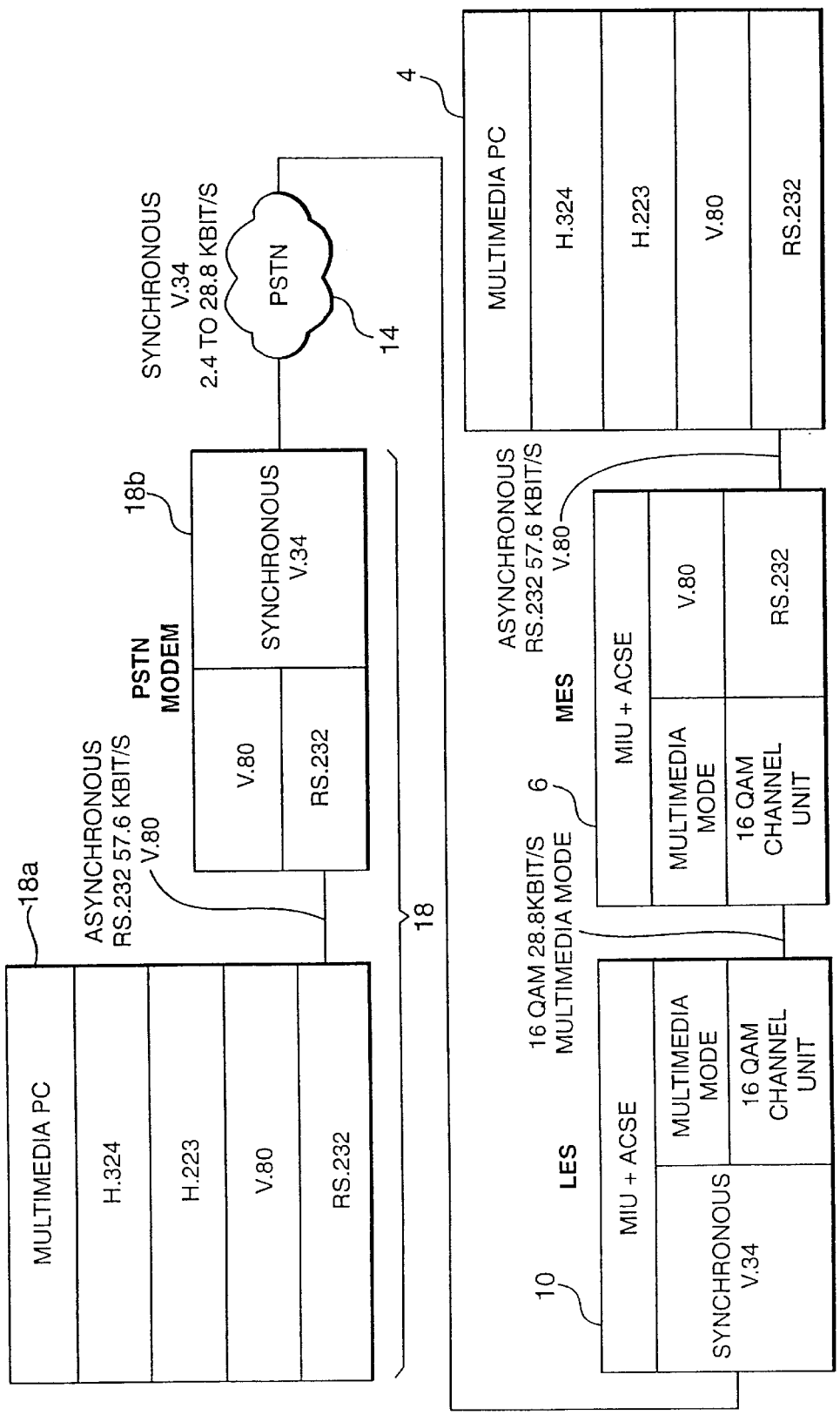
FIG. 16 is a protocol level diagram showing the system of FIG. 1 in a multimedia mode.

FIG. 16 is a protocol diagram showing an example of multimedia protocols implemented by the fixed terminal equipment 18, the network 14, the LES 10, the MES 6 and the mobile terminal equipment 4 in the system of FIG. 1.

In this example, the fixed terminal equipment 18 comprises a personal computer (PC) 18a running multimedia teleconferencing software and complying with ITU Recommendations H.324, which defines standards for low bit-rate teleconferencing over a PSTN. Framing of the multimedia data is implemented according to ITU Recommendation H.223. The personal computer is connected to a PSTN modem 18b via an RS232 physical connection and communicates therewith using the ITU V.80 protocol and timing.

The PSTN modem 18b terminates the V.80 protocol and communicates over the network 14, which is a PSTN in this case, with the LES 10 by means of a synchronous V.34 protocol, using H.223 framing. The LES 10 communicates with the MES 6 using the 28.8 kbit/s mode described above with reference to the second embodiment.

The MES 6 communicates with the mobile terminal 4 using the V.80 protocol and an RS232 physical connection. The mobile terminal 4 implements the H.223 and H.324 protocols transparently end-to-end with the fixed user terminal 18. The mobile user terminal 4 is in this case a portable personal computer PC running multimedia teleconferencing software compatible with that running on the fixed user terminal PC.

The channel format used for multimedia communications is the same as that used for facsimile services in the second embodiment, as shown in FIG. 15, with the same rate adaptation format described above with reference to Table 3 in relation to the second embodiment.

Figure 17:
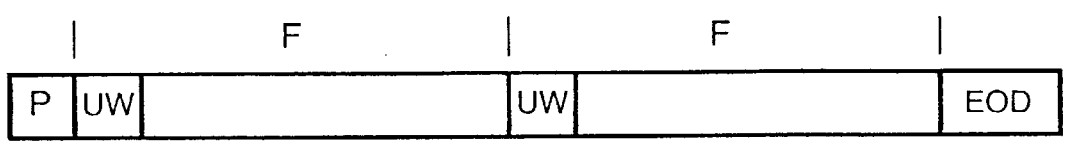
FIG. 17 shows a modification of the formats of the first to third embodiments.

A further feature which may be applied to the frame formats of any of the first, second and third embodiments will now be described with reference to FIG. 17 of the drawings. This arrangement differs from that of FIG. 5 in that a short preamble P is transmitted at the beginning of a burst of frames F, after a period of silence on the SCPC channel. Reference is made to co-pending application number [Agent's Ref: J.401 12GB], the contents of which are incorporated by reference in so far as they relate to a data carrier activation technique for a 64 kbit/s satellite channel similar to that of the third embodiment of the present application. The carrier word comprises a repeated sequence of the following 16QAM symbol, in the same modulation scheme as that shown in FIG. 4:

TABLE 4

| Preamble | |
|---|---|
| $I_1$ | 0 |
| $I_0$ | 1 |
| $Q_1$ | 0 |
| $Q_0$ | 0 |

The number of carrier word symbols transmitted in the carrier word varies for each embodiment, as follows:

TABLE 5

| Embodiment | Number of Symbols | Symbol Rate/kSymbols/s |
|---|---|---|
| 1 | 4 | 8 |
| 2 | 8 | 16 |
| 3 | 16 | 33.6 |

The preamble symbol has a power level corresponding to the average power level of the 16 QAM constellation, and the preamble P constitutes a constant power level signal of approximately 500 $\mu$s duration. The transmission of the preamble P assists in automatic level control using a feedback loop in a high power amplifier (HPA) in the 16 QAM modulator 32, so that the transmit power can be ramped up to the required level in 500 $\mu$s or less. If the preamble P were not transmitted at the beginning of each burst, the transmission would begin with a unique word UW which does not have a constant power level, and the automatic level control would not reach a stable level for a period considerably exceeding 500 $\mu$s.

The embodiments have been described above in terms of functional blocks. However, functions of more than one of these blocks may be performed by a single unit; conversely, the function of one of these blocks may be performed by several discrete units.

The frame formats described above may be applied to other types of service. The formats themselves may be modified while still achieving the advantageous effects thereof. These and other modifications may nevertheless fall within the scope of the present invention as defined by the attached claims.

What is claimed is:

1. A method of formatting data for transmission over a satellite link, the method comprising:

receiving data and outputting said data in a format comprising one or more frames of constant length, each said frame having a frame header and comprising a plurality of data blocks of constant length each separated by a predetermined pilot signal, wherein a data block ratio of the length of each said data block to said pilot signal is selected from a group comprising the numbers 25 and 29.

2. A method as claimed in claim 1, wherein each said frame further comprises a short block, wherein a short block ratio of the length of the short block to that of the pilot signal is selected from a group comprising the numbers 17 and 8 corresponding to the data block ratio of 25 and 29 respectively.

3. A method as claimed in claim 1, wherein the pilot signal comprises a single modulation symbol and the blocks each comprise a number of modulation symbols determined by said corresponding ratio.

4. A method as claimed in claim 3, wherein the symbols are transmitted at a rate of 8 or 16 ksymbol/s, with said data block ratio of 25, or at a rate of 33.6 ksymbol/s, with said data block ratio of 29.

5. A method as claimed in any preceding claim, including transmitting said output data at L-band.

6. A method of formatting data for transmission over a satellite link, the method comprising:

receiving user data from a user terminal;

receiving signalling data relating to the status of a call over the satellite link; and in a data mode, outputting the user data and the signalling data in a format comprising a plurality of data frames each comprising a data portion derived from said user data and a first signalling portion derived from said signalling data; and in a signalling mode, outputting the signalling data in a format comprising a plurality of signalling frames each comprising a second signalling portion derived from said signalling data and a dummy portion not derived from said user data or from said signalling data; the method further comprising, in both said modes, error correction coding said output data at a predetermined coding rate; wherein said coding rate in said data mode is equal to that in said signalling mode.

7. A method as claimed in claim 6, wherein the length of said first signalling portion is 48 bits.

8. A method as claimed in claim 6, wherein the length of said data portion is selected from a group comprising 1184 bits and 2560 bits.

9. A method as claimed in claim 6, wherein said second signalling portion comprises one or two blocks of 96 bits.

10. Apparatus arranged to carry out the method of claim 6.

11. Apparatus arranged to carry out the method of claim 1.

12. A method of transmitting data via satellite to a receiving terminal, the method comprising:

transmitting the data in a format comprising a plurality of SCPC frames each comprising a sequence of 16 QAM symbols, the sequence comprising a predetermined synchronization sequence of 40 symbols, a series of data fields of 25 or 29 symbols each followed a single pilot symbols, and a final data field of 17 or 8 symbols respectively with said data fields of 25 or 29 symbols.

13. Apparatus arranged to carry out the method of claim 12.

14. A method of transmitting a data burst via satellite to a receiving terminal, comprising:

transmitting the data burst in a format comprising a sequence of data modulation symbols having a variable power level among the symbols, said sequence being preceded by a sequence of preamble modulation symbols having a constant power level.

* * * * *